April 13, 1965  E. H. HECKETT  3,178,122
STATIONARY PLANT INSTALLATION FOR PROCESSING STEEL MAKING
SLAG AND REFUSE TO RECLAIM REUSABLE METALLICS THEREFROM
Filed Aug. 2, 1960  5 Sheets-Sheet 1

FIG. 1

INVENTOR
ERIC H. HECKETT

BY *Francis J. Klempay*
ATTORNEY

April 13, 1965 E. H. HECKETT 3,178,122
STATIONARY PLANT INSTALLATION FOR PROCESSING STEEL MAKING
SLAG AND REFUSE TO RECLAIM REUSABLE METALLICS THEREFROM
Filed Aug. 2, 1960 5 Sheets-Sheet 2

FIG. 2

INVENTOR
ERIC H. HECKETT
BY Francis J. Klempay
ATTORNEY

April 13, 1965 E. H. HECKETT 3,178,122
STATIONARY PLANT INSTALLATION FOR PROCESSING STEEL MAKING
SLAG AND REFUSE TO RECLAIM REUSABLE METALLICS THEREFROM
Filed Aug. 2, 1960 5 Sheets-Sheet 3

INVENTOR
ERIC H. HECKETT

BY *Francis J. Klempay*
ATTORNEY

April 13, 1965 E. H. HECKETT 3,178,122
STATIONARY PLANT INSTALLATION FOR PROCESSING STEEL MAKING
SLAG AND REFUSE TO RECLAIM REUSABLE METALLICS THEREFROM
Filed Aug. 2, 1960 5 Sheets-Sheet 4

FIG. 5

INVENTOR
ERIC H. HECKETT
BY
ATTORNEY

United States Patent Office

3,178,122
Patented Apr. 13, 1965

3,178,122
STATIONARY PLANT INSTALLATION FOR PROCESSING STEEL MAKING SLAG AND REFUSE TO RECLAIM REUSABLE METALLICS THEREFROM
Eric H. Heckett, Valencia, Pa., assignor to Harsco Corporation, Harrisburg, Pa., a corporation of Delaware
Filed Aug. 2, 1960, Ser. No. 47,031
12 Claims. (Cl. 241—76)

The present invention relates generally to the art of operating steel making plants and more particularly to the provision of a stationary plant installation for disposing of and processing steel making slag and refuse to recover reusable metallics therefrom. In normal steel making operations, substantial quantities of steel become entrapped in the slag. The slag is usually collected in slag pots and after a teeming period, during which the majority of the heavier ferrous metal settles down and collects in the bottom of the pots and becomes at least partially solidified, the pots are dumped into a slag pit to thereby free the large chunks of ferrous metal or "skulls" from the slag. After cooling, the skulls may be broken up either by cracking with a large ball or lancing with an oxygen torch for recharging into the steel making furnaces. After thus disposing of the skulls and other large pieces of material, the remaining slag and the general refuse associated with steel making operations may be processed to reclaim the reusable metallics therefrom. Such steel making slag and refuse usually comprises a high enough percentage of metal bearing material to warrant the processing thereof for the purpose of reclaiming and recovering those portions of the bulk materials having acceptable purity of metallic content. However, large tonnages of the bulk material must be processed in a very efficient manner if such processing is to be economically feasible. While the above has long been recognized in the art and various methods and apparatus for recovering the resusable metallics are in wide spread use throughout the steel making industry, the need still exists for a plant installation which is adapted to process large tonnages of the bulk material produced as a by-product of steel making operations in a continuous and integrated manner with respect to the other facilities of the steel making plant. Close proximity to the steel making plant is objectionable as utilizing valuable space and adding to the dust in the immediate atmosphere. Also, prior art methods and apparatus have required very substantial capital investment and the recently introduced oxygen convertor type of steel making furnace produces a very granulose and abrasive slag of relatively small particle size which is not adapted to be efficiently processed by the prior art methods and apparatus.

In view of the above, it is the primary or ultimate object of the present invention to provide a highly improved stationary plant installation for processing steel making slag and refuse to reclaim reusable metallics therefrom in a continuous, highly efficient and integrated manner with respect to the other facilities of the steel making plant. More specifically, I provide a plant installation wherein the cooled slag and refuse is dumped into a large hopper by trucks or the like and wherein the various size classifications of the reusable metallics are collected at spaced discharge points. The plant installation may be expeditiously and is preferably removed an appreciable distance from the steel making plant in the vicinity of the slag dumping pits. The plant installation herein disclosed is ideally adapted for processing large tonnages of the bulk slag and refuse in a very efficient and automatic manner.

A further object of the invention is to provide a stationary plant installation for processing steel making slag and refuse wherein the amount of recovered and reusable metallics is substantially increased when compared with prior art apparatus and methods for a similar purpose. A stationary separating plant comprising a plurality of various magnetic separating means and size separating means is employed to insure recovery of the maximum amount of reusable metallics from the slag and refuse. The size separation and the individual magnetic separation of the distinct size classifications is particularly advantageous in that the magnetic separator means may be designed for a specific size of material whereby the separation of the smaller reusable metallics from the waste material is highly efficient. In this manner the stationary plant installation of the present invention is ideally adapted for processing the pulverulent and relatively fine slag coming from oxygen convertor type of steel making furnaces.

Another object of the invention is to provide a stationary plant installation of the type above described which is rugged and durable whereby the same is adapted to withstand continuous and sustained operations. The apparatus disclosed is also characterized by its extreme simplicity in construction and operation.

The above, as well as other objects and advantages of the present invention, will become more readily apparent upon consideration of the following specification and accompanying drawing wherein there is disclosed a preferred embodiment of the invention.

Figure 1:
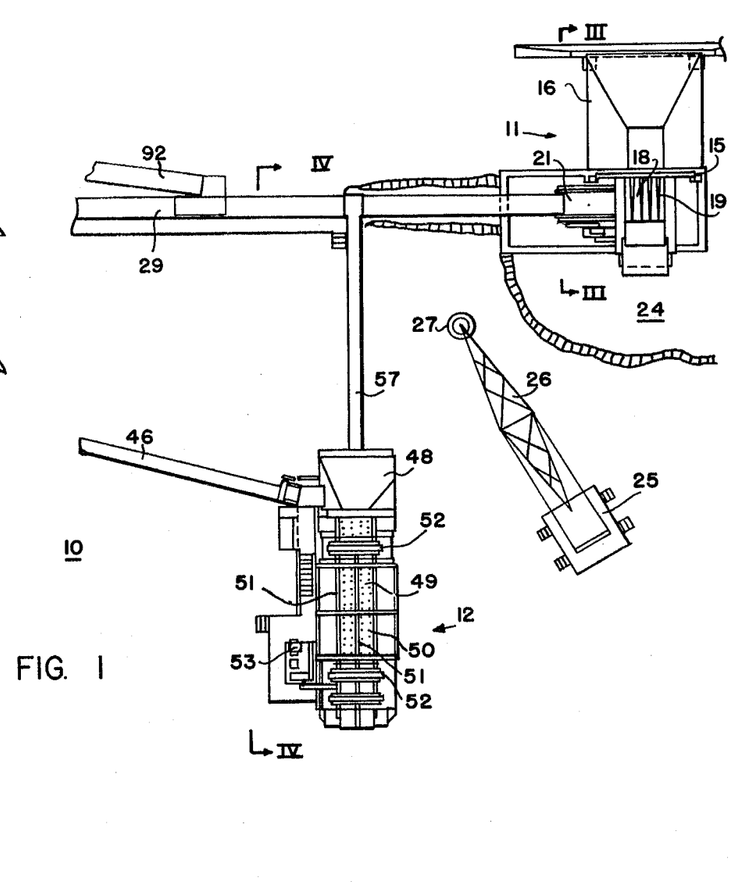
FIGURE 1 is a schematic plan view of a stationary plant installation for processing steel making slag and refuse to reclaim reusable metallics therefrom constructed in accordance with the teachings of the present invention.
Figure 2:
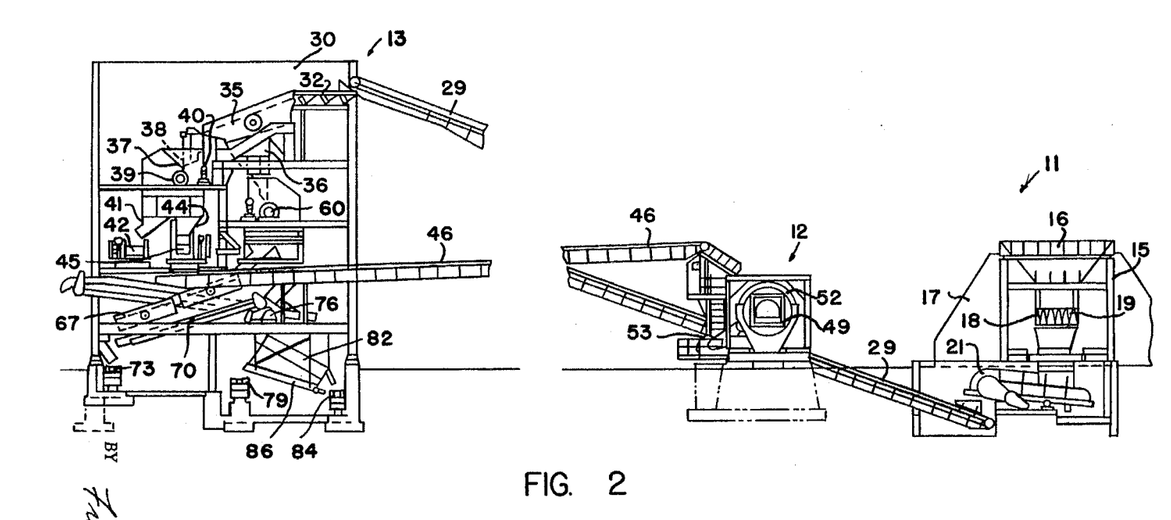
FIGURE 2 is a side elevation of the plant installation shown in FIGURE 1.
Figures 3, 4:
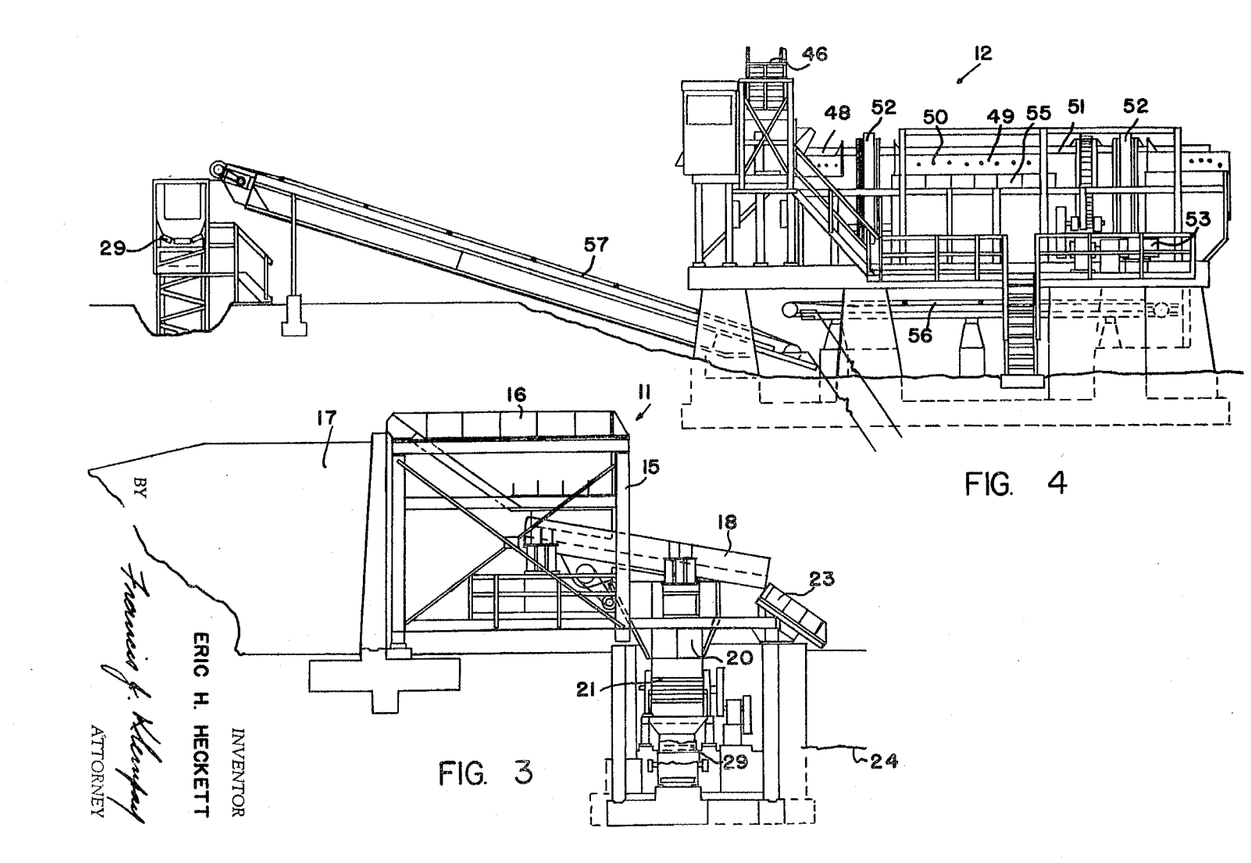
FIGURES 3, 4 and 5 are end elevational views taken generally along the lines III—III, IV—IV and V—V respectively, of FIGURE 1.
Figure 5:
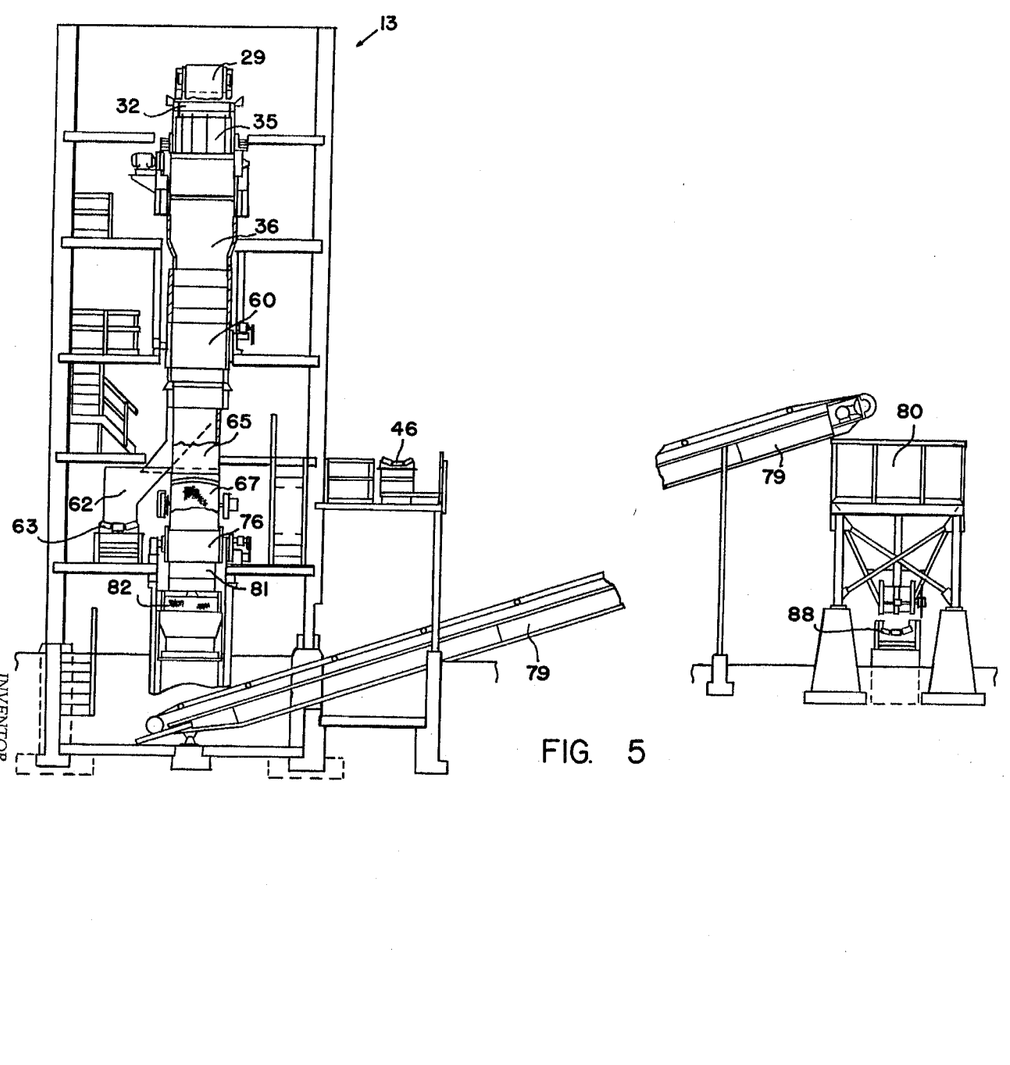
Figure 6:
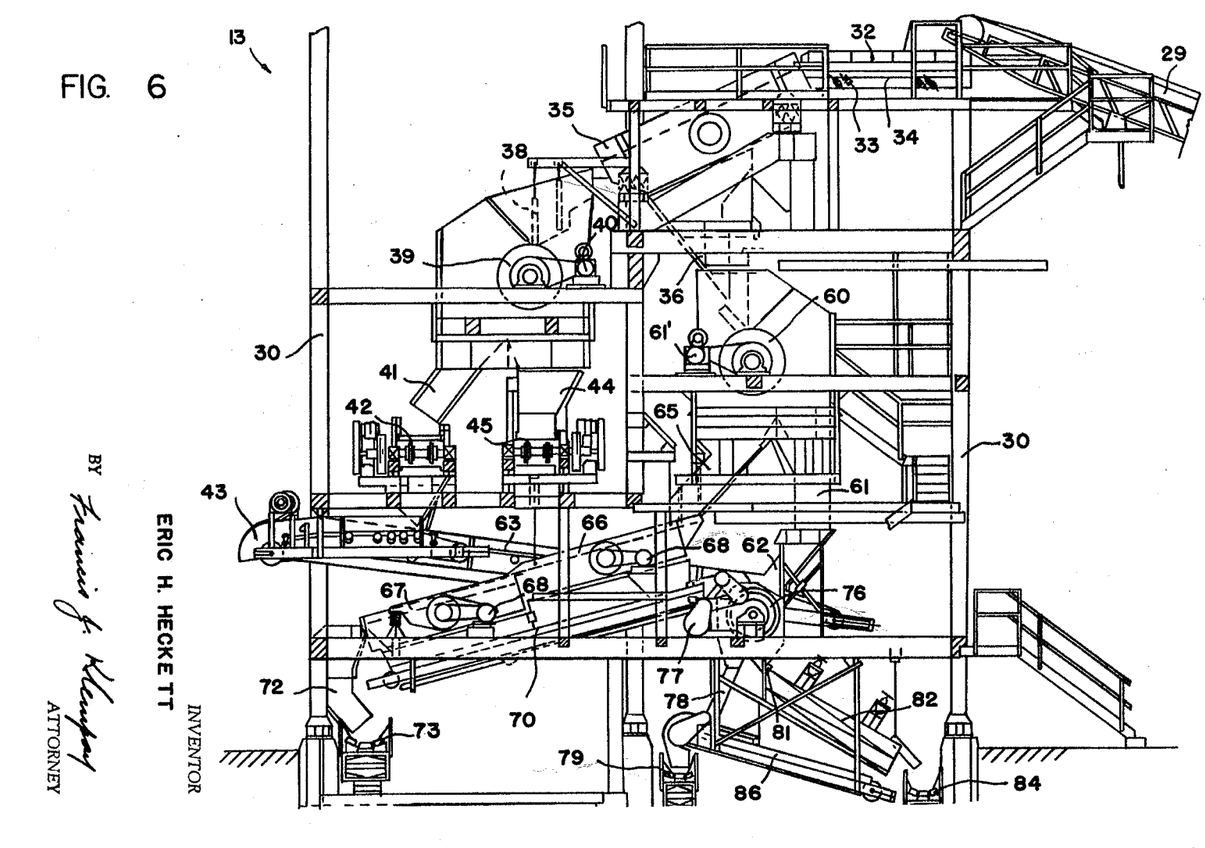
FIGURE 6 is an enlarged fragmentary side elevational view of the separating plant employed in the plant installation shown in FIGURE 1.

Referring now to the drawing, and initially to FIGURE 1 thereof, the reference numeral 10 designates an area which is preferably located a substantial distance from the steel making plant and which is also preferably located adjacent the slag pits. The usual slag pots containing the partially solidified slag and skulls are dumped in the slag pits and after further cooling the skulls are broken up and/or removed for reuse. The remaining bulk slag and the refuse from the steel making operations—the latter comprising sweepings, discarded and broken machine parts, broken-up machinery, etc.—are then transported to the area 10 for further processing by the plant installation of the present invention. The slag pits, not particularly shown, are preferably positioned and operated in accordance with the teachings of my U.S. Patent No. 2,887,225 entitled "Method and Apparatus for Disposing of Open Hearth Slag and Refuse," which is assigned to the assignee of the present invention.

The stationary plant installation of the present invention is located in the area 10 in accordance with and for the reasons above set forth and comprises a large heavy duty hopper and grizzly 11, a perforate continuous flow rotatable tumbler barrel 12, a magnetic and size separating plant 13 and various conveyor and loading means adapted to service this equipment. The heavy duty hopper and grizzly 11 has a structural framework 15 that supports a large feed hopper 16. A ramp 17 is positioned adjacent one side of the hopper 16 whereby trucks filled with slag and refuse (coming either from the associated slag pits or directly from the steel making plant) may drive up and dump their loads directly into the large feed hopper 16.

The material dumped into the feed hopper 16 is discharged onto a downwardly inclined grizzly 18. The grizzly 18 is formed by a plurality of spaced bars 19 and is very rigidly constructed to withstand the substantial impact forces occurring when bulk slag and waste material is dumped into the feed hopper 16. The bars 19 of the grizzly are appropriately spaced whereby that portion of the bulk slag and refuse having a predetermined maximum particle size will fall through the grizzly and through the chute 20 onto an apron feeder 21. The vibrating apron feeder 21 is of well known construction and is adapted to feed the material falling through the grizzly 18 in a vibrating and regulated manner to prevent clogging or jamming of other portions of the plant installation.

The oversize pieces of slag and refuse which are unable to pass through the openings between the bars 19 of the grizzly 18 move across the grizzly and drop into a downwardly inclined chute 23 which discharges the same into a large breaking pit 24. A conventional crawler type of drag line crane 25 having a boom 26 is positioned to service the breaking pit 24 and may reduce or break the oversize pieces falling into the breaking pit 24 with the use of a conventional breaking ball, not particularly shown. The drag line crane 25 may be employed for breaking up and removing the large skulls from the oversize pieces and for feeding broken oversize pieces gleaned from the breaking pit, by means of a portable magnet 27, for example, directly to the perforate continuous flow rotatable tumbler barrel 12 as will be hereinafter more fully explained.

The slag and refuse having a predetermined and acceptable maximum particle size which passes through the openings in the grizzly 18 is deposited by the vibrating apron feeder 21 on an elongated and upwardly inclined feed conveyor 29. The feed conveyor 29 transports this material to the top of the magnetic and size separating plant 13. The magnetic and size separating plant 13 comprises a rather large vertical building structure 30 constructed on the area 10 a substantial distance from the large hopper and grizzly 11 to enable the feed conveyor 29 to raise the slag and refuse having a predetermined maximum particle size to the top of the building 30. The material on the feed conveyor 29 is deposited on a vibratory picking table 32 which is adapted to be oscillated in a longitudinal direction by means of vibrator units 33. A suitable platform 34 surrounds the picking table 32 and in normal operations workmen will be stationed on this platform to cull refractory bricks, wood, etc. from the bulk slag and refuse. The refractory bricks picked out of the feed by the workmen positioned adjacent the picking table 32 represent an important by-product of the stationary plant installation which may be sold for reuse.

After moving across the picking table 32 the slag and refuse having a predetermined maximum particle size drops onto a vibrating and downwardly inclined screen 35. The material of a particle size that is smaller than the openings in the vibrating screen 35 falls through these openings and is directed by a chute 36 to other processing apparatus as will be hereinafter more fully explained. The larger size slag and refuse (having a maximum particle size determined by the spacing between the bars 19 of the grizzly 18 and a minimum particle size dependent upon the size of the openings in the vibrating screen 35) is discharged into a chute 37 positioned at the lower end of the vibrating screen 35. A plurality of dangling weights 38 are positioned in the chute 37 to retard and break up the flow of the larger slag and refuse falling into the chute 37. This larger slag and refuse is directed by the chute 37 over the outer periphery of a magnetic separating drum 39 which is adapted to be rotated by a variable speed motor 40 acting through conventional driving means. The arrangement is such that the waste material which is not attracted and held to the periphery of the magnetic drum 39 and hence which does not have a predetermined minimum metallic content is directed by a chute 41 to a transversely extending vibratory apron feeder 42. The apron feeder 42 carries the waste material to a forwardly extending waste conveyor 43 (see FIGURE 1).

The larger slag and refuse that is magnetized and held to the outer periphery of the magnetic separating drum 39 is directed by a chute 44 to a transversely extending vibratory apron feeder 45. The material on the apron feeder 45, having a predetermined minimum and acceptable metallic content and having a predetermined maximum and minimum particle size, is moved to and drops on a longitudinally extending feed conveyor 47 whereby this material is conveyed to and deposited in a large feed hopper 48 positioned at the charging end of the perforate continuous flow tumbler barrel 12. It will be noted that the bulk slag and refuse dumped into the large feed hopper 16 first passes over the grizzly 18 to remove oversize pieces therefrom and then is conveyed by feed conveyor 29 to the magnetic and size separating plant where refractory materials and the like are picked therefrom, the smaller size slag and refuse is removed for further processing and the waste material which does not have a predetermined minimum metallic content is discarded. The magnetizable pieces and particles of slag and refuse having a predetermined maximum and minimum particle size are fed into the perforate continuous flow rotatable tumbler barrel 12.

The perforate continuous flow rotatable tumbler barrel 12 comprises an elongated and open ended barrel 49 having apertures of a predetermined size 50 in the sides thereof. The barrel 49 is rigidly reinforced by longitudinally extending beams 51 and encircling rings 52. Suitable rollers, not particularly shown, support the barrel 49 and the same is adapted to be rotated by a motor 53 acting through conventional gearing. The internal surface of the barrel 49 is lined with a plurality of wear resistant plates, not shown, spaced in a manner to define a screw-like working surface for conveying the material through the barrel. The perforate continuous flow rotatable tumbler barrel is preferably constructed in accordance with the teachings of my U.S. Patent No. 2,837,289 entitled "Tumbler Barrel for Impact Cleaning of Metal Scrap."

Also deposited in the hopper 48 of the perforate continuous flow rotatable tumbler barrel are larger size pieces of slag and refuse which have been gleaned from the breaking pit 24 with the use of the portable magnetic attachment 27 of the portable crane 25, for example. The oversize pieces of the bulk slag and refuse dumped into the large feed hopper 16 which are unable to pass through the spacings between the bars 19 of the grizzly 18 are directed to the breaking pit 24 as previously described.

The perforate continuous flow rotatable tumbler barrel subjects the magnetizable slag and refuse of a predetermined minimum and maximum particle size delivered by conveyor 46 from the magnetic and size separating plant 13 and any additional pieces gleaned from the breaking pit 24 by the portable magnet 27 to a violent and continuous churning and impacting whereby the masonry and other hard encrusting materials are broken from the metallics and the encrusting materials are crushed and reduced to a smaller size. The larger pieces gleaned from the breaking pit 24 by the portable magnet 27, whether comparatively clean or deeply encrusted with waste material, will be fairly large and of highly irregular shape. The addition of these pieces to the mix inside the barrel is highly beneficial in grinding away and breaking up the encrusting material adhering to the reusable metallics. The material is forced through the barrel at a predetermined rate and the larger size cleaned metallics are carried out the open downstream end of the barrel 49. These cleaned metallics of a larger size (depending upon the spacing between the bars 19 of the grizzly 18, the size of the openings in the vibrating screen 35 and the size of the apertures 50 in the sides of the barrel 49) have been cleaned to such an extent that they have a very high degree of metallic content. Such larger size cleaned metallics are especially well suited for use in recharging the steel making furnaces of a steel plant and may be discharged directly from the downstream end of the barrel into suitable mobile hauling equipment or stored as is most desirable and expedient in a given installation.

As previously mentioned, the encrusting material broken from the larger metallics is crushed and reduced by the constant impacting and churning taking the place in the barrel. This crushed encrusting material, along with the smaller metallics which may still be partially encrusted with waste material, drops through the apertures 50 in the sides of the barrel. A pair of guide plates 55 are positioned along the sides of the barrel 49 and define a V-shaped chute which effectively channels all of the material falling through the apertures 50 to a conveyor 56. The smaller metallic particles are at least partially freed from the encrusting material and represent a high enough percentage of the total bulk of the material falling through the apertures 50 in the sides of the barrel 49 to warrant further reclamation operations.

The conveyor 56 transports the tumbled mixture of smaller metallics and crushed encrusting material to an upwardly directed conveyor 57 which in turn discharges the same onto the feed conveyor 29. The feed conveyor 29 carries this material plus the bulk slag and refuse passing through the grizzly 18 to the top of the magnetic and size separating plant 13 where this tumbled mixture is again passed across the picking table 32 and the downwardly inclined vibrating screen 35. As previously explained, that portion of the tumbled mixture having a smaller particle size than the openings in the vibrating screen 35 will fall into chute 36 for further processing while that portion having a particle size larger than the openings in the vibrating screen is dropped over the periphery of the magnetic separating roll 39 to separate the waste material from the material having predetermined magnetic properties and hence a predetermined minimum metallic content. This latter material is again transported to the charging end of the perforate continuous flow rotatable tumbler barrel via apron feeder 45, conveyor 46 and hopper 48.

The stationary plant installation of the present invention provides a substantially closed circuit between the tumbler barrel 12 and the magnetic and size separating plant 13 whereby the pieces of a particle size larger than the openings in the vibratory screen 35 and smaller than the apertures 50 in the sides of the barrel 49 are passed in a continuous manner over the magnetic separating drum 39 and through the perforate continuous flow rotatable tumbler barrel 12 until such pieces are either reduced in size by the tumbling and impacting in the barrel whereby the same pass through the openings in the vibrating screen 35 or are discarded as waste on the conveyor 43. The closed circuit comprises the feed conveyor 29, picking table 32, vibrating screen 35, magnetic separating drum 39, apron feeder 45, conveyor 46, hopper 48, barrel 49, conveyor 56 and conveyor 57. The material falling through the apertures 50 in the sides of the barrel 49 is processed by the same equipment which processes the bulk slag and refuse of a predetermined maximum particle size that is delivered from the large heavy duty hopper and grizzly 11 and this reduces the amount of equipment involved while yet insuring that the pieces having an intermediate particle size are sufficiently tumbled and agitated to break the encrusting materials therefrom.

As intimated above, the bulk slag and refuse passing through the openings in the vibrating screen 35 and having a predetermined maximum particles size is adapted to be further processed to reclaim the reusable metallics therefrom. This portion of the bulk slag and refuse is directed by the chute 36 over the outer periphery of a magnetic separating drum 60 which is rotated by a drive motor 61'. The waste material which does not cling to the periphery of the magnetic separating drum 60 falls through vertical chutes 61 and 62 onto a waste conveyor 63 which extends longitudinally outwardly of the building 30. The waste conveyors 43 and 63 extend from the building 30 in generally parallel relation and are adapted to convey the waste material to suitable dumping areas or, if desired, to apparatus, not shown, for processing the waste material to provide aggregate or the like useful in construction, for example. The waste material on conveyor 43 will have a particle size larger than the openings in the vibrating screen 35 but smaller than the spacing between the bars 19 of the grizzly while the waste material on the conveyor 63 will have a particle size smaller than the openings in the vibrating screen 35.

The remainder of the material passing over and clinging to the magnetic separating drum 60 and therefore having a predetermined minimum metallic content is directed by chute 65 onto a pair of aligned and downwardly inclined vibrating screens 66 and 67. The vibrating screens 66 and 67 are oscillated by drive devices 68 and are provided with openings of a predetermined size. The magnetic material from the magnetic separating drum 60 which has a smaller particle size than the openings in the vibrating screens 66 and 67 will drop therethrough and onto an upwardly directed conveyor 70 for reasons to be hereinafter more fully explained.

The magnetic material separated by the magnetic separating drum 60 and having a particle size within a predetermined range (depending upon the size of the openings in the vibrating screen 35 and the vibrating screens 66 and 67) passes over the vibrating screens 66 and 67 into a chute 72 and thence onto a transversely extending and upwardly directed conveyor 73. The material on the conveyor 73 has a high percentage of metallic content and is reusable in charging basic iron making furnaces, for example. This material is conveyed by the conveyor 73 to a storage bin 74 positioned transversely of the magnetic and size separating plant 13.

The smaller material which passes through the openings in the vibrating screens 66 and 67 falls on and is transported by the conveyor 70 to a magnetic separating drum 76 which is rotated by a drive motor 77 in accordance with the usual practice. That portion of this material which does not have a predetermined minimum metallic content is directed by chute 78 directly to a transversely extending waste conveyor 79 leading to a storage bin 80. The waste material on the conveyor 79 will have a maximum particle size determined by the size of the openings in the vibrating screens 66 and 67 as is readily apparent.

The material which clings to the periphery of the magnetic separating drum 76 is discharged through chute 81 over an oscillating screen 82. The reusable metallics passing over the screen 82 drop onto conveyor 84 which transports the same to storage bin 85. The metallics on the conveyor 84, which are usable in charging basic iron making furnaces or in sintering plants, have a maximum particle size which is determined by the openings in the vibrating screens 66 and 67 and a minimum particle size that is determined by the openings in the oscillating screen 82. The fine material passing through the openings in the oscillating screen 82 is collected on and transported by a conveyor 86 to the transversely extending waste conveyor 79.

Each of the storage bins 74, 80 and 85 is provided with a discharge gate, not shown, at the bottom thereof and a conveyor 88 extends beneath the discharge chutes of these storage bins. The bins can be individually emptied to deliver the reusable smaller metallics to suitable storage areas or directly into mobile hauling equipment and to deliver the smaller size waste material to suitable dumps or for further processing as is desired.

In some instances, as, for example, when the metal bearing pieces and particles are deeply encrusted with slag and refuse or when the waste material is being sold as a by-product of the reclamation operation, it may be desirable to further process the waste material which is not attracted and held to the periphery of the first stage magnetic separating drum 39 and hence which does not have a predetermined minimum metallic content. To accomplish this end, there is provided a crusher 90 which is positioned adjacent and to one side of the building 30 of the magnetic and size separating plant 13. A conveyor 91 extends laterally and connects the apron feeder 42 to the charging end of the crusher 90. When the crusher 90 is employed, the apron feeder 42 is reversely actuated to deliver the waste material falling over the outer periphery of the magnetic separating drum 39 to conveyor 91 which in turn transports this material to the crusher 90. The crusher 90 is of any well known construction and is adapted to forcibly crush this sized waste material (having a maximum size dependent upon the spacing of the bars 19 defining the grizzly 18 and a minimum size controlled by the size of the apertures in the vibrating screen 35) into a much smaller size. The effect of the size reduction provided by the crusher 90 is to release any pieces or particles of scrap and refuse which were not held to the outer periphery of the magnetic separating drum 39 due to the presence of a large ratio of slag in the individual relatively large size pieces. Also, the relatively large size pieces of slag are reduced in size whereby the slag is better adapted for sale.

The output of the crusher 90 is transported by a generally longitudinally extending and slightly angled conveyor 92 to the upwardly extending feed conveyor 29. The material from the crusher 90 is again passed over the picking table 32 and vibrating screen 35 to effect a further size classification. It will be noted that a closed circuit is provided between the crusher 90 and the magnetic size and separating plant 13. This closed circuit comprises the feed conveyor 29, picking table 32, vibrating screen 35, magnetic separating drum 39, apron feeder 42, conveyor 91, crusher 90 and conveyor 92. The waste material falling over the magnetic separating drum 39 travels and is processed in this closed circuit until the same is of small enough size to drop through the openings in the vibrating screen 35. When the crusher 90 is operative to crush and reduce the waste material, a pair of closed circuits (including the crusher 90 and the perforate continuous flow tumber barrel 12, respectively) are provided whereby the maximum size of the refuse and reusable metallics discharged by the magnetic and size separating plant 13 will be determined by the size of the openings in the vibrating screen 35.

Considering now the overall operation of the apparatus above described, the bulk slag and refuse coming from the slag pits and/or directly from the steel plant is dumped into the large heavy duty hopper 16. The slag and refuse having a predetermined maximum particle size (depending upon the spacing of the bars 19 defining the grizzly 18) is transported by conveyor 29 to the top of the magnetic and size separating plant 13 while the oversized pieces drop into the breaking pit 24. After an initial size separation, the bulk slag and refuse is passed over magnetic separating drum 39 and the waste material, depending upon the method of operation being employed, is either discharged on the waste conveyor 43 or transported to the crusher 90. The crusher 90 effects a size reduction of this material and the crushed waste material is returned to the feed conveyor 29. The material passing over the magnetic separating drum 39 which has a predetermined minimum metallic content is transported by conveyor 46 to the perforate continuous flow rotatable tumbler barrel 12. The barrel 49 is also fed pieces gleaned from the breaking pit 24 by the portable magnet 27 of the crane 25 and the resultant mixture within the barrel is violently tumbled and impacted to clean the larger metallics and crush the encrusting material. The larger and cleaned reusable metallics are collected at the downstream discharge end of the barrel while the smaller metallics and the crushed encrusting material falling through the apertures 50 in the sides of the barrel are redelivered to the magnetic and size separation plant by the conveyors 56, 57 and 29.

The bulk slag and refuse dropping through the openings in the vibrating screen 35 passes over the magnetic separating drum 60 and the waste material is discharged on conveyor 63 by way of chutes 61 and 62. That portion of this material having a predetermined minimum metallic content is directed over the vibrating screens 66 and 67 whereby the reusable metallics having the predetermined minimum particle size (determined by the size of the openings in the vibrating screens 66 and 67) and having a predetermined maximum particle size (determined by the size of the openings in the vibrating screen 35) fall onto the conveyor 73 and are transported to the storage bin 74.

The material falling through the openings in the vibrating screens 66 and 67 is passed over the magnetic separating drum 76 whereby the waste material is directed to conveyor 79 and storage bin 80 while the material having a predetermined minimum metallic content moves across oscillating screen 82 and is transported to storage bin 85 by conveyor 84. The reusable smaller metallics on conveyor 84 will have a maximum particle size depending upon the size of the openings in the vibrating screens 66 and 67 and a minimum particle size depending upon the size of the openings in the oscillating screen 82.

By way of example, and in no way intended to limit the present invention, the spacing between the bars 19 of the grizzly 18 may be such that any pieces over fourteen inches in size are diverted to the breaking pit 24. The openings in the vibrating screen 35 are preferably three and one-half inches in size while the openings in the vibrating screens 66 and 67 may be one-half of an inch in size. It is also preferred that the openings in the oscillating screen 82 be of one-eighth of an inch in size. In this manner the bulk slag and refuse on conveyor 29 will have a maximum particle size of fourteen inches and the material on conveyor 46 which is fed into the perforate continuous rotatable flow tumbler barrel 12 will have a particle size of three and one-half inches to fourteen inches. The reusable metallics in storage bin 74 will have a particle size of three and one-half inches to one-half of an inch while the smaller reusable metallics in storage bin 85 will have a particle size ranging from one-eighth of an inch to one-half of an inch.

It should now be apparent that I have accomplished the objects initially set forth by providing a highly improved stationary plant installation for processing steel making slag and refuse to reclaim reusable metallics therefrom. Of particular importance is the manner in which the stationary plant installation is adapted to be operated in a continuous and integrated manner with respect to the steel plant and the conventional slag pits normally associated therewith. The disclosed apparatus is adapted to process large tonnages of the slag and refuse in a highly efficient and continuous manner to reclaim a maximum amount of reusable metallics therefrom. The intermediate size particles are circulated in a closed circuit through the perforate continuous flow rotatable tumbler barrel and over a magnetic separating drum until the same are either rejected as waste or broken whereby they pass through the openings in a vibrating screen. Maximum recovery of reusable metallics is afforded by the plural size and magnetic separation steps employed since this allows each of the magnetic separating drums and the discharged chutes or dividers associated therewith to be designed and operated in accordance with the size of particles passing thereover. As will be understood, the magnetic attraction required to hold the magnetic particles to the periphery of a magnetic separating drum and the optimum position of the divider or chutes with respect to such magnetic separating drum will vary for different sizes of and types of material being processed. Another important aspect of the invention is the arrangement of the apparatus in the magnetic and size separating plant 13. The apparatus is compactly arranged in a vertical relation whereby the required space is kept to a minimum and the material being processed flows through the magnetic and size separating plant substantially by gravity without the use of complicated and expensive transporting or conveying equipment.

Although I have shown and described an illustrated embodiment of the invention, it should be apparent that many changes may be made therein. Accordingly, reference should be had to the following appended claims in determining the true scope and intent of the invention.

I claim:

1. A plant installation adapted to be located adjacent the slag pits associated with a steel making plant for reclaiming reusable metallics from steel making slag and refuse in a continuous manner comprising a feed hopper, a ram positioned adjacent said hopper, a heavy duty downwardly inclined grizzly at the bottom of said hopper and extending outwardly therefrom, a breaking pit below the discharge end of said grizzly, an upwardly extending feed conveyor positioned below said grizzly, said hopper and said grizzly being large and rigid to permit trucks and the like on said ramp to dump their loads directly into said hopper and onto said grizzly, a continuous flow open ended tumbler barrel positioned adjacent said breaking pit, said tumbler barrel having apertures in the sides thereof, said tumbler barrel having a charging end and a discharging end, a portable crane positioned adjacent said breaking pit and adapted to service said tumbler barrel by feeding larger pieces of said slag and refuse passing over said grizzly and into said breaking pit to said charging end thereof, means to collect the particles falling through said apertures in said tumbler barrel and to transport said particles to said upwardly extending feed conveyor, a magnetic and size separating building positioned in spaced relation with respect to said feed hopper and said tumbler barrel, a downwardly inclined screen positioned adjacent the top of said building, a rotatable magnetic separating drum at the lower discharge end of said screen, said feed conveyor transporting said slag and refuse to said screen, means to magnetically separate the material falling though the openings in said screen, means to collect and transport the portion of the material passing over said magnetic separating drum having a predetermined minimum metallic content to said charging end of said tumbler barrel, and means to collect and discharge from said building the waste material passing over said magnetic separating drum.

2. Apparatus according to claim 1 further comprising a vibratory picking table disposed between said screen and said feed conveyor, and a platform surrounding said picking table to allow workmen to cull refractory bricks and the like from said slag and refuse.

3. Apparatus according to claim 1 characterized in that said means to magnetically separate comprises a second rotatable magnetic separating drum positioned vertically below said screen, means to direct the material falling through the openings in said screen over said second magnetic separating drum, means to collect that portion of the material passing over said second magnetic separating drum having a predetermined minimum metallic content, and means to discharge from said building the waste material passing over said second magnetic separating drum.

4. Apparatus according to claim 3 further characterized in that said means to collect that portion of the material passing over said second magnetic separating drum and having a predetermined minimum metallic content comprises a downwardly directed chute positioned below said second magnetic separating drum, a downwardly inclined second screen positioned at the bottom of said chute, and means to collect the reusable metallics passing over said second screen.

5. Apparatus according to claim 4 further comprising upwardly extending conveyor means positioned below said second screen, a third rotatable magnetic separating drum positioned vertically below said second magnetic separating drum, said conveyor means transporting the material falling through the openings in said second screen to said third magnetic separating drum, a third downwardly inclined screen positioned below said third magnetic separating drum, means to direct the material passing over said third magnetic separating drum and having a predetermined minimum metallic content over said third screen, means to collect the reusable metallics passing over said third screen, and means to collect and discharge from said building the waste material passing over said third magnetic separating drum and the waste material passing through the openings in said third screen.

6. A plant installation adapted to be located adjacent the slag pits associated with a steel making plant for reclaiming reusable metallics from steel making slag and refuse in a continuous manner comprising a feed hopper, an inclined grizzly at the bottom of said hopper, a breaking pit for receiving the larger pieces which are unable to pass through the spacings in said grizzly, means to collect the slag and refuse falling through said spacings in said grizzly, a continuous flow tumbler barrel positioned adjacent said breaking pit, said tumbler barrel having apertures in the sides thereof and spaced charging and discharging openings, means to feed larger pieces of said slag and refuse from said breaking pit to said charging opening of said tumbler barrel, means to collect the material falling through said apertures in said tumbler barrel, size separating means, magnetic separating means positioned to magnetically separate the larger of the size classifications emitted by said size separating means, means to convey said slag and refuse falling through the said spacings in said grizzly and said material falling through said apertures in said tumbler barrel to said size separating means, means to magnetically separate the other of said size classifications emitted by said first mentioned size separating means, means to collect that portion of the material emitted by said magnetic separating means having a predetermined minimum metallic content and to convey the same to said charging opening of said tumbler barrel, and means to discharge the other portion of the material emitted by said magnetic separating means.

7. Apparatus according to claim 6 characterized in that said second mentioned means to magnetically separate comprises a second magnetic separating drum for separating said other of said size classifications emitted by said size separating means.

8. Apparatus according to claim 7 further including a second size separating means, said second size separating means being positioned to separate the magnetic portion of the material emitted by said second magnetic separating means, and means to discharge the other portion of said material emitted by said second magnetic separating means.

9. Apparatus according to claim 8 further comprising means to collect one size classification emitted by said second size separating means for reuse, a third magnetic separating means, and means to convey the other size classification emitted by said second size separating means to said third magnetic separating means.

10. A plant installation for reclaiming reusable metallics from steel making slag and refuse comprising a first size separating means, means to discharge the larger of the size classifications emitted by said first size separating means, a rotatable tumbler barrel adapted to receive said larger size classifications and having perforate side walls, said tumbler barrel having charging and discharging openings, said tumbler barrel subjecting the material therein to a violent churning and impacting, and separating said material into a pair of size classifications, means to collect the larger of said size classifications emitted by said tumbler barrel for reuse, a second size separating means, means to convey the smaller of said size classifications emitted by said first size separating means and the smaller of said size classifications emitted by said tumbler barrel to said second size separating means, first magnetic separating means for separating the larger size classification emitted by said second size separating means, second magnetic separating means for separating the smaller size classification of said second size separating means, and means to convey the classification having a predetermined minimum metallic content emitted by said first magnetic separating means to said charging opening of said tumbler barrel.

11. A plant installation adapted to be located adjacent the slag pits associated with a steel making plant for reclaiming reusable metallics from steel making slag and refuse in a continuous manner comprising a feed hopper, a ramp positioned adjacent said hopper, a heavy duty downwardly inclined grizzly positioned at the bottom of said hopper and extending outwardly therefrom, a breaking pit below the discharge end of said grizzly, said hopper and said grizzly being large and rigid to permit trucks and the like on said ramp to dump their loads directly into said hopper and onto said grizzly, a conveyor positioned below said grizzly for collecting and conveying the material falling through the openings therein, means to first size and thereafter magnetically separate the larger sized material on said conveyor, a continuous flow open ended tumbler barrel positioned adjacent said breaking pit, said tumbler barrel having openings in its side walls said tumbler barrel having a charging opening, a portable crane positioned at said breaking pit, said crane servicing said tumbler barrel by feeding large pieces gleaned from the material passing over said grizzly and into said breaking pit to said charging opening of said tumbler barrel, and means to convey the magnetic portion of the magnetically separated material to said tumbler barrel.

12. A plant installation for reclaiming reusable metallics from steel making slag and refuse comprising size separating means, a rotatable magnetic separating drum disposed at the discharged end of said size separating means, a pair of chutes positioned below said magnetic separating drum, one of said chutes directing the material having a predetermined minimum metallic content and clinging to the outer periphery of said magnetic separating drum, the other chute directting the remaining portion of the material passing over said magnetic separating drum, a crusher, means for transporting said remaining portion of said material to said crusher, means to return the output of said crusher to said size separating means, a rotatable tumbler barrel having perforate side walls, said tumbler barrel having charging and discharging openings, means to transport that portion of the material passing over said magnetic separating drum having a predetermined minimum metallic content and directed by said one of said pair of chutes to the charging opening of said tumbler barrel, said tumbler barrel subjecting the material therein to a violent churning and impacting and separating said material into a pair of size classifications, means to collect one of said size classifications emitted by said tumbler barrel for reuse, and means to convey the other of said size classifications emitted by said tumbler barrel to said size separating means.

References Cited by the Examiner

UNITED STATES PATENTS

| | | | |
|---|---|---|---|
| 1,381,204 | 6/21 | Lawry | 209—123 |
| 1,512,870 | 10/24 | Ullrich et al. | |
| 1,797,597 | 3/31 | Ullrich. | |
| 1,905,780 | 4/33 | Ahlman. | |
| 2,189,711 | 2/40 | Eigenbrot. | |
| 2,721,035 | 10/55 | Lankford et al. | 209—38 X |
| 2,728,454 | 12/55 | Heckett. | |
| 2,971,703 | 2/61 | Rath | 241—24 |

FOREIGN PATENTS 488,344   12/53   Italy.

J. SPENCER OVERHOLSER, *Primary Examiner.*

ROBERT A. O'LEARY, EDWARD J. MICHAEL,
*Examiners.*